(12) United States Patent
Bergan

(10) Patent No.: US 12,111,013 B2
(45) Date of Patent: Oct. 8, 2024

(54) TANK FEASIBLE FOR CRYOGENIC SERVICE

(71) Applicant: Lattice International AS, Billingstad (NO)

(72) Inventor: Pål G. Bergan, Nesøya (NO)

(73) Assignee: Lattice International AS, Billingstad (NO)

( * ) Notice: Subject to any disclaimer, the term of this patent is extended or adjusted under 35 U.S.C. 154(b) by 0 days.

(21) Appl. No.: 18/043,785

(22) PCT Filed: Sep. 3, 2021

(86) PCT No.: PCT/NO2021/050183
§ 371 (c)(1),
(2) Date: Mar. 2, 2023

(87) PCT Pub. No.: WO2022/050848
PCT Pub. Date: Mar. 10, 2022

(65) Prior Publication Data
US 2023/0313946 A1    Oct. 5, 2023

(30) Foreign Application Priority Data

Sep. 4, 2020 (NO) .................................. 20200964

(51) Int. Cl.
*F17C 1/12* (2006.01)
(52) U.S. Cl.
CPC ........ *F17C 1/12* (2013.01); *F17C 2201/0109* (2013.01); *F17C 2203/0358* (2013.01);
(Continued)
(58) Field of Classification Search
CPC ................ F17C 1/12; F17C 2201/0109; F17C 2203/0358; F17C 2203/0391; F17C 2203/0629; F17C 2221/033
(Continued)

(56) References Cited

U.S. PATENT DOCUMENTS 3,251,602 A    5/1966 Williams et al.
3,547,302 A    12/1970 Jackson et al.
(Continued)

FOREIGN PATENT DOCUMENTS

CN    210372876 U    4/2020
DE    102004015295 A1    10/2004
(Continued)

OTHER PUBLICATIONS

Westbye, Daniel; International Search Report; PCT/NO2021/050183; Date of mailing: Nov. 25, 2021; 3 pages.
(Continued)

*Primary Examiner* — J. Gregory Pickett
*Assistant Examiner* — Niki M Eloshway
(74) *Attorney, Agent, or Firm* — Bradley Arant Boult Cummings LLP

(57) ABSTRACT

The invention provides a tank feasible for cryogenic service and a method of building the tank. The tank comprises: an inner tank, thermal insulation, and an outer shell that is airtight, wherein the thermal insulation is arranged outside the inner tank and the outer shell is arranged outside the thermal insulation, further comprising a coupling through the outer shell, wherein a vacuum pump outside the tank can be coupled for suction of air and gas from the volume between the inner pressure tank and the outer shell, and further comprising an opening from outside the tank to inside the inner tank for loading and unloading of fluid, wherein the inner tank in operation contains fluid and the volume between the inner tank and the outer shell is at vacuum. The tank is distinguished in that: the thermal insulation comprises several block elements arranged side by side on the inner tank, with a gap in between the block elements, wherein the outer shell comprises several parts that have been joined together to cover the whole outer (Continued)

surface of the insulation, wherein parts of the outer shell covering an insulation block element have shape matching the insulation block element shape and parts of the outer shell covering the gaps between the block elements have inward or outward oriented curved shape if seen in cross section along the respective gaps and are flexible by contracting or stretching the curved shape.

12 Claims, 10 Drawing Sheets

(52) U.S. Cl.
CPC ............... *F17C 2203/0391* (2013.01); *F17C 2203/0629* (2013.01); *F17C 2209/22* (2013.01); *F17C 2221/011* (2013.01); *F17C 2221/012* (2013.01); *F17C 2221/013* (2013.01); *F17C 2221/014* (2013.01); *F17C 2221/033* (2013.01); *F17C 2223/0161* (2013.01); *F17C 2270/0105* (2013.01); *F17C 2270/0171* (2013.01); *F17C 2270/0173* (2013.01); *F17C 2270/0189* (2013.01)

(58) Field of Classification Search
USPC ....................................................... 220/560.1
See application file for complete search history.

(56) References Cited

U.S. PATENT DOCUMENTS

| | | | |
|---|---|---|---|
| 3,769,118 | A | 10/1973 | Tariel et al. |
| 4,050,609 | A | 9/1977 | Okamoto et al. |
| 5,727,492 | A | 3/1998 | Cuneo et al. |
| 6,880,719 | B1 * | 4/2005 | Sutton ................ F17C 1/02 220/560.11 |
| 6,971,537 | B2 | 12/2005 | Enright, Jr. |
| 8,757,422 | B2 | 6/2014 | Nishizaki et al. |
| 8,807,382 | B1 | 8/2014 | Haberbusch et al. |
| 2010/0018225 | A1 * | 1/2010 | Yang ................ F17C 1/002 62/53.2 |

FOREIGN PATENT DOCUMENTS

| | | |
|---|---|---|
| DE | 102004015295 B4 | 4/2006 |
| ES | 2929501 T3 | 11/2022 |
| JP | H06293290 A | 10/1994 |
| JP | 3111658 U | 7/2005 |
| JP | 2007218317 A | 8/2007 |
| JP | 2016161116 A | 9/2016 |
| JP | 6435517 B2 | 12/2018 |
| KR | 20160015437 A * | 2/2016 |
| KR | 20160074327 A * | 6/2016 |
| KR | 101647444 B1 | 8/2016 |
| KR | 20160119363 A * | 10/2016 |
| KR | 20160148307 A * | 12/2016 |
| KR | 20180029118 A | 3/2018 |
| NO | 328904 B1 | 6/2010 |
| NO | 20200965 A1 | 3/2022 |
| WO | WO-9810982 A1 | 3/1998 |
| WO | WO-2005093315 A1 | 10/2005 |
| WO | WO-2012148154 A2 | 11/2012 |
| WO | WO-2015073719 A1 | 5/2015 |
| WO | WO-2016018038 A1 | 2/2016 |
| WO | WO-2019124628 A1 | 6/2019 |
| WO | WO-2020050515 A1 | 3/2020 |
| WO | WO-2020251373 A1 | 12/2020 |

OTHER PUBLICATIONS

Lee, Yeong-Beom, et al.; Development of Reinforced Polyurethane Foam Insulator Using HFCS as Blowing Agent; R&D Division, Korea Gas Corporation; <http://www.ivt.ntnu.no/ept/fag/tep4215/innhold/LNG%0Conferences/2007/fscommand/PO_11_Y_Lee_s.pdf>; Downloaded from the Internet on Feb. 22, 2023; 16 pages.

Westbye, Daniel, International Search Report; PCT/NO2021/050184; Date of mailing: Dec. 2, 2021; 3 pages.

Bergan, Pål G., "Insulated Tank With Integrated or Operatively Connected Support System", U.S. Appl. No. 18/043,885, filed Mar. 2, 2023, 56 pages.

* cited by examiner

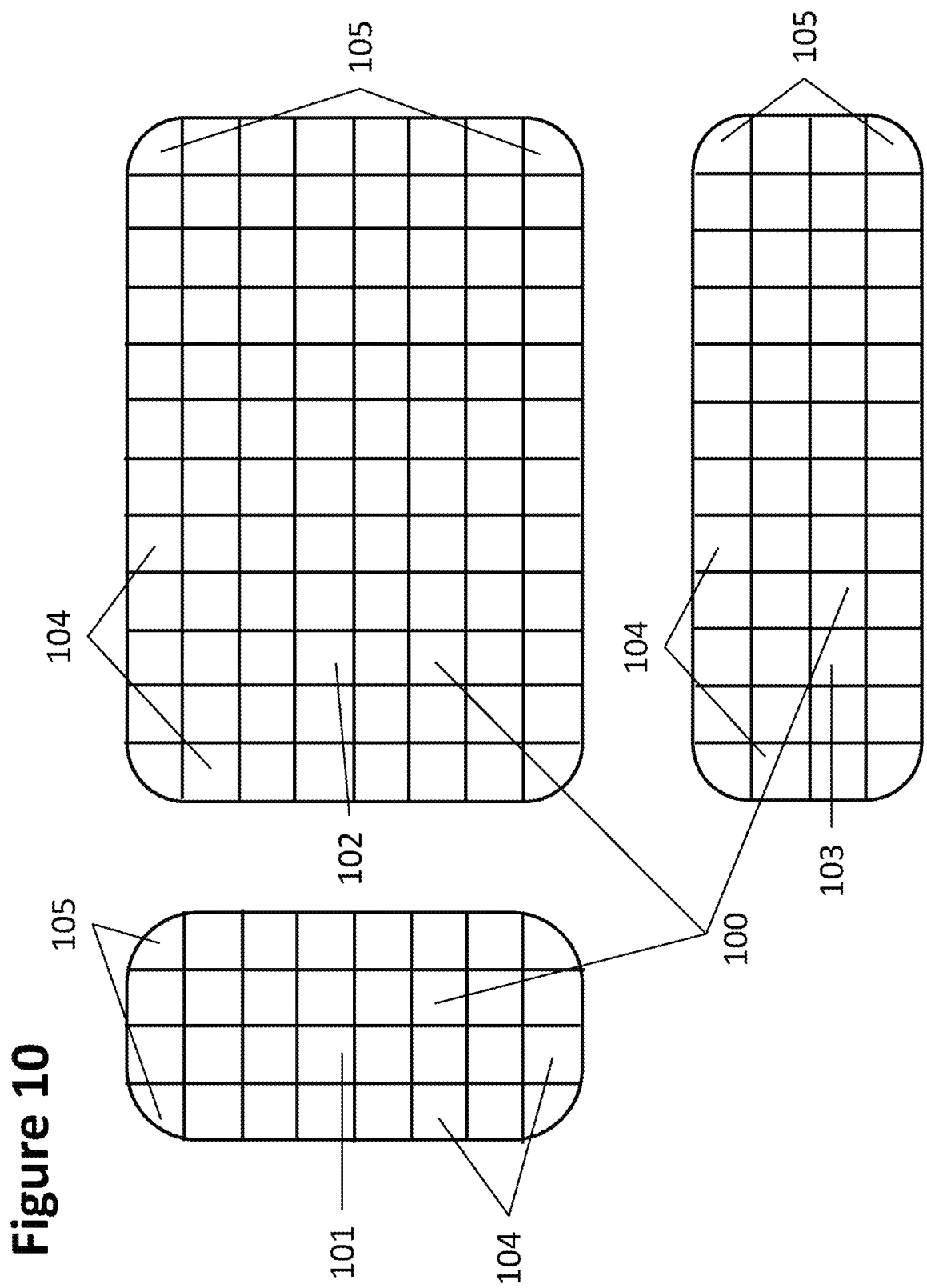

TANK FEASIBLE FOR CRYOGENIC SERVICE

TECHNICAL FIELD

The present invention relates to storage and transport of fluids. More specifically, the invention provides a tank particularly feasible for storage and transport of cryogenic fluids and a method for fabricating the tank.

BACKGROUND ART

Storage and transport of cryogenic fluids are challenging, particularly at the lowest range of temperatures. There exists a broad variety of gases that are stored and transported at very low temperatures and are typically kept in insulated containments. One example is Liquid Natural Gas which liquifies at −163° C. and are normally insulated with external, porous or fibrous non-vacuum insulation layer while vacuum insulation has also been applied for relatively small and medium size tanks.

During recent times there has been a growing interest and need for storing liquid hydrogen which poses a particular challenge for insulation. At atmospheric pressure oxygen liquefies at −183° C. and nitrogen liquefies at −196° C. while hydrogen liquefies at −253° C. When these components of air become liquid or solidifies at the liquefied hydrogen temperature, the insulating properties of traditional thermal insulation based on the insulation property of still air deteriorates, since said air components liquify or even solidify, resulting in increased thermal conductivity and near total failure as thermal insulation.

The cryogenic temperature range apparently has no common definition, but an often-used definition is −150° C. down to absolute zero at −273° C.

For thermal insulation at cryogenic temperatures and enhanced thermal insulation in general, it is known that vacuum insulation may be a preferred solution. The absence of matter at vacuum results in that thermal conductivity and thermal convection in principle are eliminated as heat transfer mechanisms. Ideal vacuum may be difficult to obtain in practice; still, "near perfect vacuum" conditions will largely prevent heat transfer. However, significant energy transfer by radiation will still exist whereby this phenomenon depends on the absolute temperature to the fourth order of the surfaces of the opposing sides of the vacuum space. Thus, it is customary to fill the vacuum space with radiation-reducing materials such as perlite, glass bubbles, multi-layer insulation, etc. It is known that this method combing the vacuum and the radiation-reducing materials provides better insulation performance than the vacuum alone for most very low temperature application, and clearly also for 20 K as for liquid hydrogen.

For relatively small and medium size tanks, the principle of double shell tanks with vacuum within the volume between the tank layers can be applied. Clearly, the two tanks cannot be kept apart without some form of connections in between, and it is unavoidable that such connections will provide thermal bridges and ingress of heat. Although this problem may be manageable, a larger problem will be that the internal tank at cryogenic temperatures unavoidably will shrink significantly; this means that the important connections between the two shell layers may not be able to maintain their stabilizing, connecting role. For instance, the thermal shrinkage of the inner tank holding the cryogenic fluid may be as much as 7.5 mm per meter tank; this means that the problem with inner tank thermal shrinkage becomes increasingly more significant with larger tanks. It is to be noted that loss or weakening of connections does not only have to do with spacing, but also that the outer tank will be subject to external, atmospheric pressure under which the outer tank may buckle if the supports are not kept intact. Buckling instability of the outer shell may be a serious problem for large tanks and this limits the applicability for double shell vacuum tanks to rather moderate tank sizes.

Attempts to solve the size problem have been made. The nearest prior art publication compared to the present invention apparently is U.S. Pat. No. 8,807,382 B1, describing and illustrating a storage system having a flexible vacuum jacket rather than a stiff outer shell. A multilayer insulation supports the flexible vacuum jacket.

Some further prior art is represented by the publications JP3111658U, JP6435517B, JPH06293290A, JP2007218317A and DE102004015295B4.

Providing a tank design that allows tanks of virtually any volume and shape, at affordable cost, allowing operation temperature down to −253° C., and having sufficient insulation efficacy to avoid excessive internal pressure buildup by boiling of cryogenic liquid, thereby avoiding gas venting or having to re-liquify boil-off vapor by active cooling and condensation of gas, would be a very beneficial objective. Another important objective is to provide a system of vacuum insulation that works equally well for small as for very large tanks; i.e. the tank with insulation system is fully scalable. Scalability for size and internal pressure inside the internal tank can be ensured by using a so-called "lattice pressure vessel", or LPV for short, for the internal tank; inter alia as described and illustrated in the patent publications WO 2012/148154 A2 and WO 2015073719 A1.

The objective of the present invention is to provide a tank that is beneficial with respect to one or more of the technical effects mentioned above.

SUMMARY OF INVENTION

The objective of the invention is met by providing a tank feasible for storage and transport of fluids at cryogenic temperatures, comprising:
  an inner tank,
  thermal insulation, and
  an outer shell that is airtight,
wherein the thermal insulation is arranged outside the inner tank and the outer shell is arranged outside the thermal insulation,
  further comprising a coupling through the outer shell, wherein a vacuum pump outside the tank can be coupled for suction of air and gas from the volume between the inner pressure tank and the outer shell, and
  further comprising an opening from outside the tank to inside the inner tank for loading and unloading of fluid,
  wherein the inner tank in operation contains fluid and the volume between the inner tank and the outer shell is at vacuum.
  The tank is distinguished in that:
  the thermal insulation comprises several block elements arranged side by side on the inner tank, with a gap in between the block elements, preferably the gap is on the outward side of the insulation,
  wherein the outer shell comprises several parts that have been joined together to cover the whole outer surface of the insulation, wherein parts of the outer shell covering an insulation block element have shape matching the insulation block element shape and parts of the outer shell covering the gaps between the block elements have inward or outward oriented curved shape if seen in cross section along the respective gaps and are flexible by contracting or stretching the curved shape.

The invention also provides a method of fabricating a tank of the invention, distinguished by the steps: to fabricate or provide the inner tank; to fabricate or provide insulation block elements; to fabricate or provide an opening piece for filling or emptying fluid; to fabricate or provide a coupling for a vacuum pump, to fabricate or provide outer shell parts; to arrange and fasten the block elements on the outer surface of the inner tank, side by side; to arrange the opening piece and the coupling for a vacuum pump; and to arrange and join together the outer shell parts.

The invention also provides use of the tank of the invention for storage and transport of cryogenic fluid, or other cold or hot fluid relative to ambient temperature, such as fluid at temperature of at least 30° C. different from ambient temperature.

The opening from outside the tank to inside the inner tank for loading and unloading of fluid is a combined inlet and outlet or separate structures. Said combined or separate structures represents the only significant thermal bridges through the insulation of the tank.

Preferable embodiments are as defined in dependent claims, to which reference is made. Further preferable embodiments are described or illustrated herein.

Preferably, the gaps in between the insulation block elements are on the outer side of said elements, that is the side of the elements facing the outer shell. Smaller gaps shall extend from the outer surface to the inner tank surface for the purpose of avoiding overlapping of adjacent blocks during thermal contraction of the inner tanks and for facilitating efficient extraction of air or gas during the vacuum process. Preferably, the inner tank is a pressure tank. Preferably, the block elements are arranged and fastened to the inner tank by glue and/or mechanical devices, close together towards the surface of the inner tank, without a gap between the block elements at the interface between the inner tank and the block elements as installed at ambient temperature, wherein the gaps below an optional insulation cut-out under curved parts of the outer shell preferably comprise non-parallel sides forming V-shaped or U-shaped gaps between blocks elements, as seen in cross section, wherein the gaps preferably are retained when the tank is in cryogenic service for retaining flexibility and retaining a channel for vacuum suction as temperature decreases to cryogenic temperature inside the insulation.

The curved parts of the outer shell extend outwards or inwards from the general outer shell surface covering the insulation block elements. As will be further explained, the empty tank at ambient temperature will have the largest gaps between the insulation block elements and correspondingly the largest width of the curved parts covering the gaps. To ensure bending outwards or inwards for all curved parts, along their full length, thereby avoiding locking and high stress concentrations, an initial curvature is preferably provided for all curved parts. When the tank is loaded with cryogenic fluid, such as LH2 at −253° C., the inner tank thermally contracts, resulting in contraction of the insulation blocks and the curved parts. The colder the fluid, the more contraction at the joining zones between blocks.

The curved parts in principle represent a "minimum energy" type geometry which can be adopted from natural buckling functions when compressing the gaps between blocks. The simplest, linear buckling form is a cosine function which can be scaled up in amplitude to serve the purpose of a flexible corrugation. Both outward corrugations and inward corrugations are feasible. Both the span of the corrugation and the chosen initial amplitude depends on the specific case relating to overall cooling and size of insulation blocks. This concept provides a highly efficient shape of corrugation that minimizes both the general stress level as well as stress concentrations in the corrugations during thermal contraction of the main tank. Both assumed ideal cosine functions as well buckling shapes generated by numerical simulations can be used. Their actual performance, such as resulting stresses, can be established by numerical simulations or testing for each detailed embodiment.

If the inner tank contracts a dimension D per meter inner tank outer surface, when being cooled down from ambient temperature to cryogenic temperature, the gap on the outward side of the insulation block and the width of the curved part covering the gap preferably is significantly larger than the actual thermal contraction taking place across the gap itself. As the person skilled in the art will understand, the value of D depends on the temperature difference between ambient temperature and the cryogenic temperature as filled with a cryogenic fluid. Typically, for LH2, D is up to about 7.5 mm per meter for inner tank in aluminum and up to about 5 mm for inner tank in stainless steel. A sufficiently wide gap on the outward side of the insulation block and sufficient width and height of the curved part covering the gap must be chosen to avoid unacceptable plastic strain and obtain stress level below defined limits according to codes and standards.

Preferably, the corrugated shape of the flexible outer shell where two gaps are crossing is obtained by a superimposing cosine-like shapes or by adopting a shape that is generated by buckling analyses as will be explained further.

The parts of the outer shell are preferably welded together, alternatively joined otherwise, for example by brazing or gluing, but always using joining methods ensuring an airtight joint under all operating design conditions, for the full design life. The operating design conditions are for example +45 to −253° C. for liquid hydrogen. A normal targeted design life for such applications is 30 years. This is considered to be easily obtained because of low stress concentrations and straining and the fact that there will be very few thermal load cycles. Thus, fatigue is not a critical design factor since once filled with cryogenic fluid the inner tank will stay at or around the cryogenic temperature, due to the extreme insulation properties of the tank and the fact that a required quantity of cryogenic fluid typically will always be retained, even when "empty". Heating and expansion of the inner tank will only happen in case of inspection requirements, such as every fifth year, and possible repair.

Preferably, when the inner tank in operation contains cryogenic fluid, the full volume between the inner tank and the outer shell is at vacuum. The inlet and outlet penetrate the inner tank and the outer shell and are thereby not directly between the inner tank and the outer shell.

The tank of the invention preferably comprises a "lattice pressure vessel" inner tank, meaning that the inner tank comprises identical or similar internal structure as described and illustrated in the patent publications WO 2012/148154 A2 and WO 2015073719 A1. Thereby, size limitation, as well as shape limitation, are eliminated for the tank of the invention. More specifically, the "lattice pressure vessel" concept eliminates the size and shape limitation of the inner tank and the insulation concept of the present invention eliminates the size limitation and any shape limitation of the insulation. Moreover, the invention can also be applied to other shell shapes such as cylindrical pressure vessels. Clearly, cylinders are not scalable in size.

The flexible curved parts of the outer shell between and above block elements can be separate parts that are connected to pre-fastened outer shell parts on the insulation blocks. The outer shell parts can be applied after the insulation block units are mounted on the inner tank surface and the flexible curved zones covering the gaps may be an integral part of the outer shell sections. The actual joining connection between different parts of the outer shell may thus be located away from the block joints. The potentially weaker joints are thereby located away from the part of the outer shell subject to highest stress levels.

The tank of the invention, insulated as prescribed, is feasible for storing any fluid or material, particularly if having temperature different from the ambient temperature outside the tank, colder or warmer. The unique advantage provided by the invention increases with the size of the tank and the temperature difference between the tank contents and ambient temperature outside the tank. However, the insulated tank can in principle be advantageous for storing and transporting any fluid at relative high temperature difference to ambient temperature due to exceptional insulation combined with design facilitating practical and economic fabrication, whereas it is primarily intended for storage and transport of fluid at cryogenic temperatures or very cold temperatures, wherein the inner tank in operation contains the fluid, such as liquid hydrogen—LH2—at −253° C. or any other gas or liquid needing efficient thermal insulation, especially eliminating liquefaction or solidification of surrounding air.

Although specific reference has been made to tanks for storage and transport of liquid natural gas and liquid hydrogen, the present invention is equally well suited for a wide range of other cooled and cryogenic fluids such as liquid nitrogen, liquid oxygen, liquid carbon dioxide, liquid petroleum gas, liquid ammonia and many types of industrial gases. In addition, the tank of the invention is feasible for storage and/or transport of warm fluids, such as steam and superheated steam, for example in a thermal energy battery as described and illustrated in international patent publication WO 2020/251373 A1. Polymer based insulation may however require replacement with mineral based insulation and metal materials may be replacement with high temperature stable alloys.

The flexible airtight connection zones between blocks must have enough elastic flexibility and deformability to adapt to the thermal contraction and/or expansion of the internal tank and be able to tolerate vacuum inside and at least one atmosphere pressure from the outside, without permanent deformation or damage. The flexible airtight joint between blocks can be a single-layer structure where a thin metal layer with the joint geometry is welded to the flat part of the outer metal layer of the blocks. Additional sealing may be applied over the weld zones by applying a polymer or sealing tape. Other joining methods may also be applied in which the joint part is connected to the flat part by a combination of welding and sealing material or fabric. Alternatively, the flexible geometry of the metal skin between blocks is formed as a part of the outer skin and attached to the blocks. The joining seams between the different sections of the outer skins may thus be located away from the zone between blocks such as at the middle lines of the blocks.

The geometry of the outer shell at said curved flexible joining zones or -lines between blocks is an important part of the current invention. In the case where the inner tank shrinks due to filling of a cold fluid, the joining zones or gaps between neighboring blocks (also termed block elements or elements) will shrink significantly implying that the outer shell will have to deform to accommodate for this local shrinkage or contraction at the block joining zones. Notably, the flat parts of the outer shell cannot be much thermally deformed since the skin maintains the temperature of the surrounding, outside air. Thus the "channel width" will become narrower and the corrugated outer shell must bend and contract accordingly.

The most critical part is where these channels meet at the cross between four neighboring blocks. Clearly the cross zone cannot be just two crossing channels with continued channel geometry because continuing channels will lock against this mechanism. Clearly, the geometrical shape of the skin at the channel intersections will have to allow for contraction in two perpendicular directions at the same time. The geometry at crossing channels must be such that only minimum bending energy is activated during contraction of the inner tank. As will be shown, this principle of adopting a "natural deformation shape" provides low bending stresses without high stress concentrations and hot spots with significant yield. The "minimum potential energy" geometry of a beam or plate section subjected to unidirectional contraction is a cosine function (corresponding to the initial cosine buckling form of a clamped beam); thus, such a shape or similar should be applied to the contracted channel sections. The crossing channel areas require a more complex shape to allow for contraction in two directions at the same time. A preferred shape of the crossing channels can be a cosine function superimposed onto the cosine geometry of the crossing channels. This will be explained in more detail later. A subsequent variation of this principle is that the geometry of the intersection zone is generated numerically from buckling shape obtained from a large displacement structural analysis using the finite element method or similar computer simulation methods.

The channel type geometry of the outer skin may either point inwards towards the inner tank, or it may point outwards away from the tank. Both alternatives are feasible and included in the present invention. When the channels point inwards the atmospheric pressure on the skin with vacuum below largely results in membrane tension in the channel sections. Alternatively, when this type of corrugation points outwards the pressure difference largely results in membrane compression in the channel zones. Structurally the first may be preferable; however, outward pointing corrugations may also have some advantages when it comes to practical production including welding of skin sections together.

It is also to be noted that the proposed "smooth" cosine function type geometry of the corrugations implies moderate plastic deformation during the metal forming of an initially flat, thin plate. The smoothness of the buckling function also implies smooth plastic bending deformations without "knots" with extreme plastic straining. The currently proposed corrugation geometry is clearly advantageous as compared with the corrugation geometry currently used in membrane tanks for LNG where the corrugation has sharp bends, folds and knots. In such case plastic straining during the initial forming of the corrugation will be very significant and, equally problematic, thermal deformations, strains and further, significant plasticization will occur during operations due to the temperature change. These geometry dependent mechanisms occurring for membrane tanks used by the maritime industry today may lead to significant local weakening the skin material with risk for development of cracks and gas leakage. FIG. 1 illustrates prior art showing a typical corrugated membrane for an LNG cargo tank. Note the extensively deformed zones in the crossing of two corrugations resulting in extreme plastic strains and "knots" that in turn also leads to very high stress concentrations during thermal contraction.

The current invention aims at greatly reducing these problems using a smooth shape for the corrugation that accommodate for the compression of the outer skin caused by contraction of the inner tank.

The inner tank can preferably be a pressure tank, meaning that the inner tank pressure can be significantly above atmospheric pressure, such as up to 20 times atmospheric pressure or even more. An inner tank with capability of overpressure allows for balancing increased temperature from heat ingress with increased gas pressure, thereby avoiding adjusting the gas pressure by releasing gas from the tank and/or having to re-liquefy boil-off gas. This approach of containing gas by compensating pressure is particularly useful for liquid hydrogen which is a lightweight energy carrier with high cost per unit energy.

The inner tank and the materials close to the inner tank must be made of material tolerating the operating temperature such as cryogenic temperature without becoming brittle. Austenitic stainless-steel alloys retain toughness at extremely low temperatures and other weldable metals, such as many aluminum alloys, are suitable for use at very low temperatures. The outer shell or skin will normally not be subject to low temperatures; however, stainless steel and aluminum may still be preferable because of reflection properties and resistance against degradation. Such materials are also advantageous in avoiding brittle cracking should an accidental leakage of cryogenic fluid from the inner tank occur.

The volume between the pressure tank and the outer shell is at vacuum, meaning pressure below atmospheric pressure, preferably far lower, such as 0.01:0.001 or 0.0001 atmosphere or lower. Clearly, the lower the pressure, the better the thermal insulation effect will be achieved.

Unlike vacuum insulation tanks with a stiff outer shell, the lay-out and geometry of the vacuum insulation system of the current invention can be used for tanks of any size and any shape. The size of the insulation blocks and, hence, the corrugation grid pattern, depends primarily on how much the internals tanks contracts as function of cooling and pressurizing, and not on the size of the tank itself. This independence of tank size is, as will be understood, caused by that the compensation for contraction of the internal tank is dealt with at local level rather than a full tank size level. Typical size of each of the insulation blocks and corresponding corrugation distance can be from 0.25 m in up to 2 m in length in either of the two surface directions. For instance, 6 mm contraction per meter of the internal tank means that the surrounding corrugation for a block with size 1 meter will have to accommodate a contraction of about 6 mm across the corrugations as well as in two directions at the crossings of corrugations. As will be understood the ability to satisfy specific contraction requirements depends on main design parameters such as size of the gap at the outer plane between blocks which determines the width of the corrugation, amplitude of the corrugation and thickness of the corrugated skin. The uniqueness of the current vacuum insulation concept originates from the fact it works equally well independent of the tank size and the cost and amount of installation work is proportional to the overall surface area of the tank. This is principally different from double shell type vacuum insulation mentioned earlier for which the strength of the outer shell (jacket) grows very much with size because of strength requirements.

The tank of the invention includes a new way of arranging vacuum insulation based on the principle of a flexible outer barrier connected with a load carrying, porous insulation using a block type insulation geometry where blocks are arranged together with gaps in between, while contraction and expansion is dealt with by the flexible joint between outer skins on the outer surface of insulation block elements. The tank can virtually have any shape and size since the shrinkage problem is solved locally with an insulation layer adapted to the internal tank geometry without introducing discrete thermal bridges. The block elements cover the full outside surface of the inner tank, with only small gaps between the block elements, wherein each block on the inside has shape or curvature fully consistent with the surface geometry of the inner tank and shape on the outside consistent with the inside and the selected thickness of the insulation layer.

The specific material selected for the insulation blocks may depend on the case of use considering internal and outside temperatures, insulation requirement, contraction flexibility, and ability for the air or gas inside the insulation to be easily evacuated. Another requirement is that the vacuum insulation blocks must be able to carry the pressure from the outside air onto the inner tank. Further material requirements may have to do with creep resistance under sustained pressure, mechanical and chemical stability, consistency enabling gluing or various forms of mechanical attachment and so on. There are several fibrous and porous materials that can satisfy these requirements, such as insulation materials used in insulation of LNG tanks. A commonly used such materials are PUF (polyurethane foam) and R-PUF (reinforced PUF).

The block geometry of the vacuum insulation layer may be produced in either of two ways. First, the insulation may be fully prefabricated with shape consistent with the location onto which they will be placed on the surface of the inner tank. Such shape may be obtained by casting in a form or by shaping and grinding insulation blocks to the specific geometry of the intended location. Attachment to the surface may be carried out with mechanical attachment methods and/or gluing. Prefabricated insulation blocks may be produced with the surface skin fully attached to the block. In such case the gap zones between the blocks have to be covered with additional strips of corrugated skin which are connected by welding and/or gluing to the prefabricated surface skin of the blocks. It is essential that the corrugated connections and welds between blocks with their outer skin have sufficient strength to carry pressure and forces from contraction of the inner tank as well as being leakage proof. Alternatively, it is an option to produce and apply the surface skin as corrugated plates directly on to insulation blocks (initially without skin) where the seams between adjacent plates are preferably located at the mid-line of the surface of the blocks. This will typically lead to reduced length of welding seams and may thus provide some advantages. Special measures may be taken to protect the insulation material against heat from welding.

An alternative to applying prefabricated insulation blocks with foam type insulation is to spray insulation layer by layer directly onto the outer surface of the inner tank. This is a method that is known and accepted for applications such as for LNG. However, use of the block concept will still be necessary since there will be need for evacuating the insulation layer in an efficient way and also for reducing the stressing of the insulation due to inner tank contraction. This may be best done by carving, grinding, or sawing a regular of deep channels, preferably all the way down to the surface of the inner tank, such that a continuous system of air evacuation channels spans the entire surface area of the inner tank. Clearly this pattern provides a block insulation geometry consistent with the current invention; the main difference from prefabricated blocks is that the blocks are formed after the insulation has been applied onto the tank. Porous insulation, such as various forms of PUF, has higher coefficient of thermal expansion than steel or aluminum. For this reason, it is preferable that the width of the gap between the blocks are wide enough for the gaps not to close when the internal tank contracts due to cooling. However, since open gaps provide heat transfer by radiation through open space it is simultaneously desirable not to make the initial gaps wider than necessary to prevent contact or closing between blocks under the outer shell. The shaping of these gaps should also account for the space required of corrugation in case the corrugation is inwards oriented.

Spray on insulation layer as here described will not deliver a completely smooth outer, finished surface. For this reason, it will be necessary to even out and smoothen the outer surface of the insulation before the corrugated surface skin is applied. This may be done by grinding and/or application of refill material at the surface. After this process the corrugated surface skin plates may attached to the insulation blocks and welded together as described for prefabricated insulation blocks without pre-attached surface skins.

As mentioned, it is important that the gap between the insulation blocks do not close due to thermal contraction of the inner tank. Moreover, such gap must be widened with a groove next to the location corrugation of the surface skin in the case when the corrugation points inwards; this is to make sure that the contraction corrugation does not at any time make direct contact with the adjacent insulation blocks. The actual geometry of the groove in the insulation layer may not be very important provided the gaps do not close during contraction; shapes such as a U or a V or other shapes may be used for the initial gap between blocks. Corrugation grooves may not be required when the corrugation points outwards from the flexible shell surface.

As explained, outer shell plates will have to be connected by welding, alternatively otherwise, with their neighbors in order to ensure a completely air-tight outer shell layer. When this implies welding the problem arises that high temperature heat due to welding will be generated locally in the skin, and that such heating could damage the underlying insulation material. Two simple methods may be applied to solve this problem. For one, the insulation block may be protected with a strip of a material that can itself sustain high temperatures and strongly reduce heat transfer to the underlying insulation block at the location of welding. An alternative method is to carve a small groove in the insulation block at the location of welding such that there is no direct contact between heated metal and insulation material. Such groove will have to be wide enough to prevent welding heat damage by heat conduction through the skin and not wider than that the skin can span of the groove without being overstressed. Accordingly, two types of grooves may be applied for the vacuum insulation system of the present innovation; (1) corrugation grooves to accommodate for inward corrugation, and (2) welding grooves to prevent damage to the insulation block caused by heat from welding. Heat protection strips is an alternative to the second type of groove.

A very beneficial effect of the insulation concept of the tank of the invention is that the thermal shrinkage problem, increasing with tank size, is solved without significant thermal bridges and with the only source of heat conduction being the porous insulation blocks themselves.

The insulation is made of a porous material. Preferably, all pores, that in this context means all air- or gas-filled volumes, are interconnected. Since the interstice material is not air-tight, vacuum evacuation removes the entrapped air or gas from the pores within the insulation material, leaving no volumes within the isolation material with significant entrapped air or gas; this ensures very good insulation performance. Efficient evacuation of air or gas prevents that gas inside pores turns into solids in case the inner tank has extremely low temperature as when being filled with fluids such as liquid hydrogen. Such porosity is often termed an open type porosity.

The tank of the invention is comprising channel-like corrugations of the outer skin, arranged where gaps and grooves between insulation block elements form contraction space, including special corrugation geometry in positions where said corrugations are crossing, wherein the channel-like corrugations are shaped to sustain and accommodate for contractions between insulation block elements caused by thermal contraction of the inner tank holding the cold or cryogenic fluid, and where the corrugation of the outer flexible shell maintains at all time its air-tightness as barrier between the external air pressure and the vacuum space between the outer shell and the inner tank.

A typical block size dimension may be in the range of 0.25 m to 2.5 m in either shell surface direction, the chosen size depending on the specific thermal and mechanical conditions and, to some extent, the size of the tank. In special applications the size of the block elements, and hence the distance between corrugations, may even go beyond these limits. In short, the size and geometry of the block elements as well as the dimensions of the corrugations may depend on the geometry of the inner tank, properties of materials used, temperature variation, tank support conditions and other practical matters. The efficiency of the evacuation- or vacuuming process can be another consideration since it may take longer time to achieve the wanted vacuum conditions with very large blocks than with smaller blocks.

Preferably, the gaps between block elements forming open spaces between blocks do not close during cooling and the insulation blocks do not interfere with the corrugations, at any time during operations.

The block elements must be firmly attached to the inner tank in a safe and consistent way; this can be achieved by several means. Gluing as well as direct spraying of the insulation material may be used. However, it may also be an option to apply mechanical attachments that holds the insulation blocks firmly against the inner tank. One such approach is first to attach or weld guide rails to the surface of the inner tank in a pattern that exactly corresponds with the footprint of the insulation blocks against the inner tank. With such rails in place the insulation blocks can be correctly positioned on the inner tank surface and the insulation blocks may be held in place with connectors between the rails and the insulation blocks, such as by inserting connecting pins or other attachment means into the insulation material. Such mechanical fastening means can be made of material with low thermal conductivity. Notably, the insulation blocks will also be pressed firmly against the inner tank by the external air pressure when vacuuming is applied. The external air pressure is thereby transferred onto the inner tank through the insulation blocks spanning the vacuum layer.

The tank insulation, in the form of block elements arranged together under the airtight outer skin and over/ outside the inner tank, must have allowable compressive strength of at least 0.1 MPa (corresponding to one atmosphere pressure) and have adequate elastic stiffness ensuring that stresses and deformations will be kept within acceptable limits over the full operating temperature range such as from +45° C. to −253° C.

The flexible corrugations have a defined shape which minimizes stress within the corrugated skin and allows for actual contraction and expansion of the gap between blocks during operations. The skin will always have a temperature quite similar to the surrounding temperature although the inner tank may subject to extreme cooling such as with −253° C. with liquid hydrogen.

A main target of the present invention is to provide an overall insulated tank solution capable of holding extremely cold fluids, such as liquid hydrogen and liquid nitrogen. It is also clear that the current modular, block type insulation system emerges as an attractive alternative for thermal insulation of tanks holding other types of fluids that require thermal insulation, such as liquid natural gas, liquid petroleum gas, cooled and pressurized carbon dioxide, etc.

The tank of the invention can also be a mobile tank, such as a fuel tank for a drone, an airplane, a vehicle, a train or a ship; in such applications the flexibility and low weight of the vacuum insulated tank of the invention with regard to shape and size is very important. The modular scalability of the invention and the fact that the tank shape can be other than, but also including, a cylinder or a sphere is particularly important when storing fluids such as liquid hydrogen since the overall volume efficiency of storage within one or a multiple of tanks becomes extremely important due to the very low energy density per unit volume of liquid hydrogen.

BRIEF DESCRIPTION OF DRAWINGS

FIG. 10 shows an example of application of the invention for a cryogenic lattice pressure vessel

DETAILED DESCRIPTION OF THE INVENTION

Figure 1:
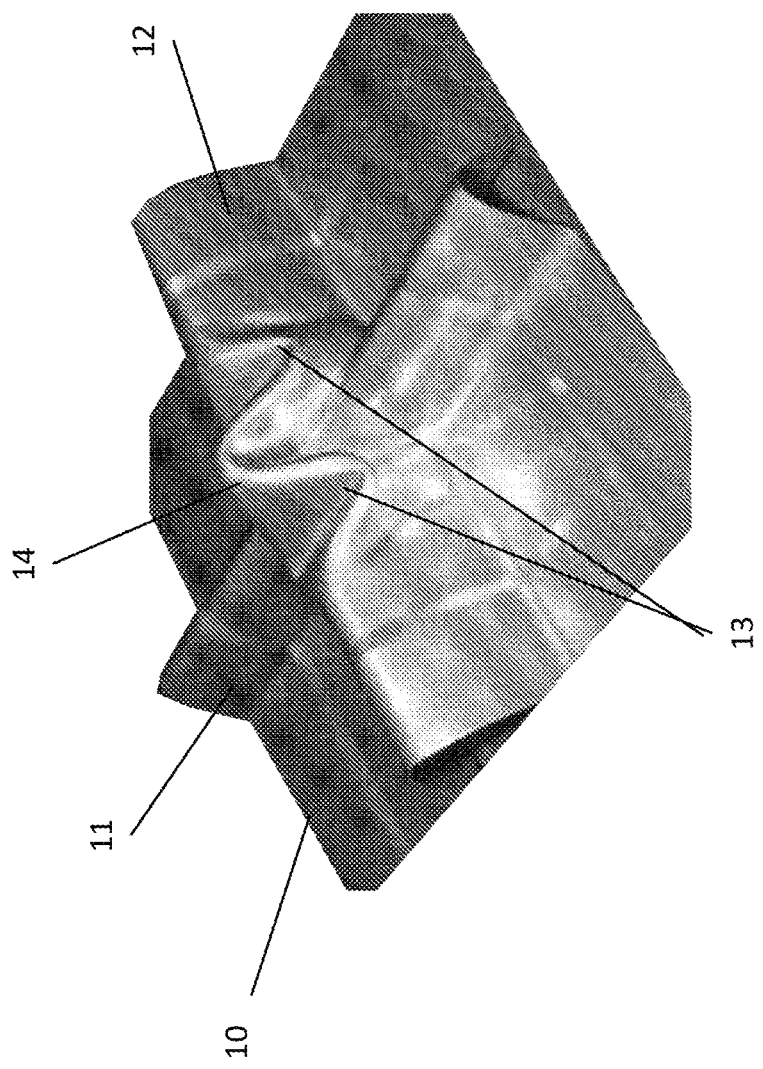
FIG. 1 illustrates corrugation pattern used in many current thermally insulated membrane tanks

The problem of dealing with thermal contraction or expansion within multi-barrier insulation systems is often dealt with using some form of geometric corrugation by which a flexible membrane barrier allows for the deformations arising from temperatures changes at the different sides of the insulation. A typical example of dealing with different thermal conditions and deformations is the design concept currently used for thermally insulated tanks for storage of cooled or cryogenic fluids such as liquid natural gas (LNG). In the case of membrane type cargo tanks for carrying LNG onboard ships it is the ship structure itself that provides the load bearing support structure whereas the cryogenic fluid is kept insulated and separated from this structure by a layer of thermal insulation with sufficient thermal insulation capacity and strength and a leak-tight membrane against the internal fluid. Regulations may also require secondary, leak-tight barriers inside the insulation layer for safety reasons. A basic problem arises when the membrane barrier against the cold fluid thermally contracts significantly whereas the tank structure, as integral part of the ship, does not contract. With major thermal contraction a flat membrane would clearly break due to thermal contraction and straining. This problem is normally dealt with by supplying an initially flat membrane with geometric corrugations in order that the corrugation zones deal with the contraction through bending within the corrugations. What makes this problem difficult is that the thermal contraction naturally takes place in both directions of the membrane which requires that the corrugations also must be oriented in two directions. Unavoidably there will be crossing of corrugations which implies that the corrugations cannot be continuous but rather must be "broken" at these intersections to fully accommodate two-dimensional contraction. FIG. 1 shows a typical example of how the corrugation intersection problem has been resolved by current practice. In addition to the basic membrane plane 10 there is corrugation 11 in one direction and a somewhat larger corrugation 12 in the perpendicular direction. The "breaking" of the intersecting corrugations is done by providing additional folds or "knots" 13 and 14 normal to the length direction of the two corrugations such that each of them can contract also in their own length direction. It is seen that the corrugations have multiple rather sharp bends which implies significant local plastic straining during geometric forming of the corrugation pattern. Clearly, additional thermally generated stresses will arise during operation caused by the actual thermal contraction of the membrane. The double channel geometry with doubly folded knots implies very stiff structural zones which typically will give rise to strong stress concentrations or "hot spots" which are likely to exceed normally accepted stress levels for the specific material used. The current invention defines a significantly different corrugation and intersection geometry which strongly reduces plastic straining during geometric forming and ensures acceptable stresses due to thermal deformations during operations.

Figure 2:
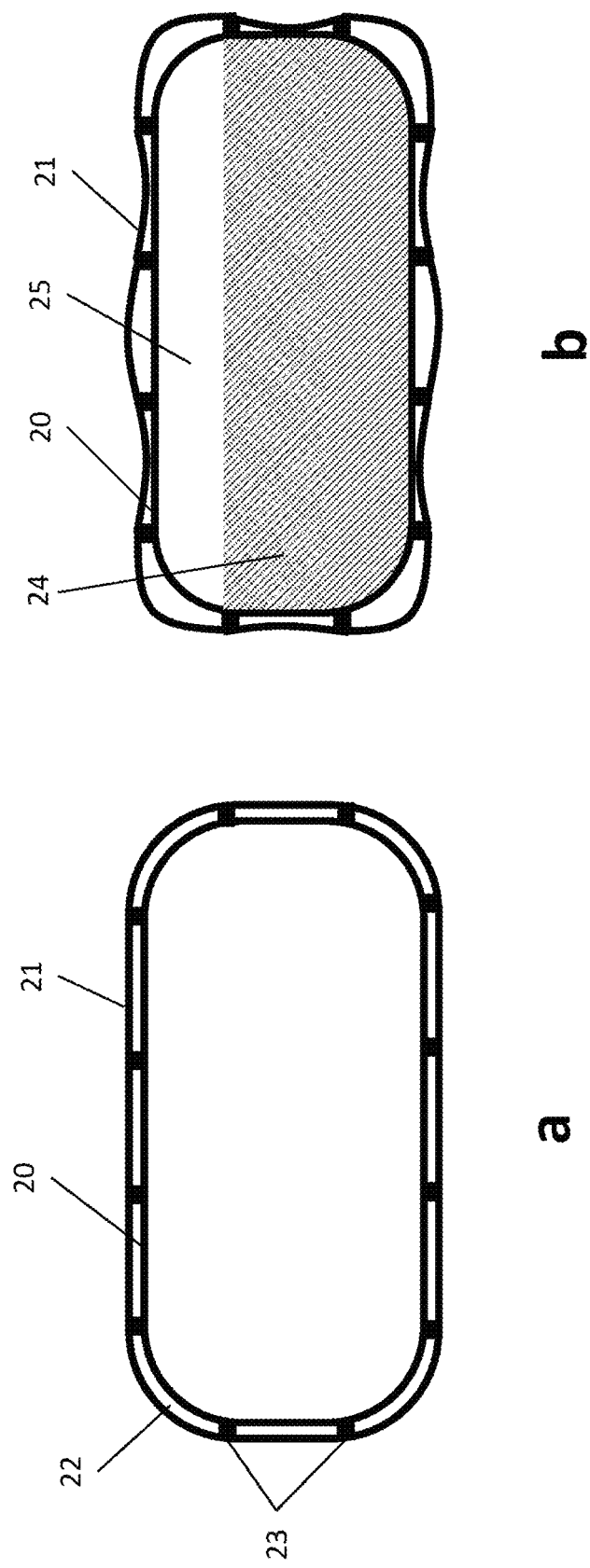
FIG. 2 illustrates a conventional approach to vacuum insulation of a pressure vessel with a double shell design FIG. 3 illustrated a vacuum insulated tank system according to the present invention

Special requirements arise in connection when employing vacuum for thermal tank insulation. As shown in FIG. 2*a* a common approach for a vacuum insulated tank, not according to the present invention, is to provide the inner containment tank 20 with an outer, air-tight, stiff "jacket" or shell 21 such that the space 22 between these two shells can be evacuated for the purpose of thermal insulation. There will normally be some structural connections 23 between the inner 20 and the outer shells 21, such connections 23 may be of various shape and stiffness and are only shown in principle here. The containment for the cooled and liquid fluid 20 must be designed as a pressure vessel since heat ingress cannot be avoided and internal pressure will accordingly build up due to transition from liquid 24 to gas 25. The outer shell is exposed to outer pressure due to atmospheric pressure on one side and near perfect vacuum on the other 22 and must be designed for this. Outer pressure on a shell also means that it can be subject to structural instability and buckling. As shown the outer shell 21 can be partly supported onto the inner shell by some sort of connections 23 that ensure distance between shells as well as a degree of structural support for the outer shell. Note also that connections 23 between the two shells intrinsically will result in thermal bridges. Unfortunately, structural compatibility and interactive support between shells becomes challenging when the containment tank shrinks significantly due filling of cold fluid 24 and the inner shell 20 shrinks accordingly due to cooling. In practice this means that the buckling or stability problem grows with the actual size of the vacuum insulated tank since buckling depend strongly on overall tank size and the difference in distance or incompatibility between the two layers is directly proportional the actual tank size. To some extent this problem can be handled with building a very strong and stiff outer shell that can sustain external pressure and shrinkage of the inner tank while the stability and buckling problem increases significantly with shell size. The instability and buckling problem are illustrated in principle to the right in FIG. 2*b* where the outer shell partly is forced to follow the contraction of the inner shell and the outer shell buckles due to outer pressure. Alternatively, the connections 23 can be made flexible whereas the outer shell then may then suffer from an overall buckling mode. So far double shell vacuum insulated tanks have been limited to a few hundred cubic meters in size for the reasons mentioned. The current invention suggests a different approach to vacuum insulation in which the outer shell is replaced by a modular block concept with a corrugated, highly flexible membrane or "skin" on the outside supported by porous insulation in the blocks in the vacuum space.

Figure 3:
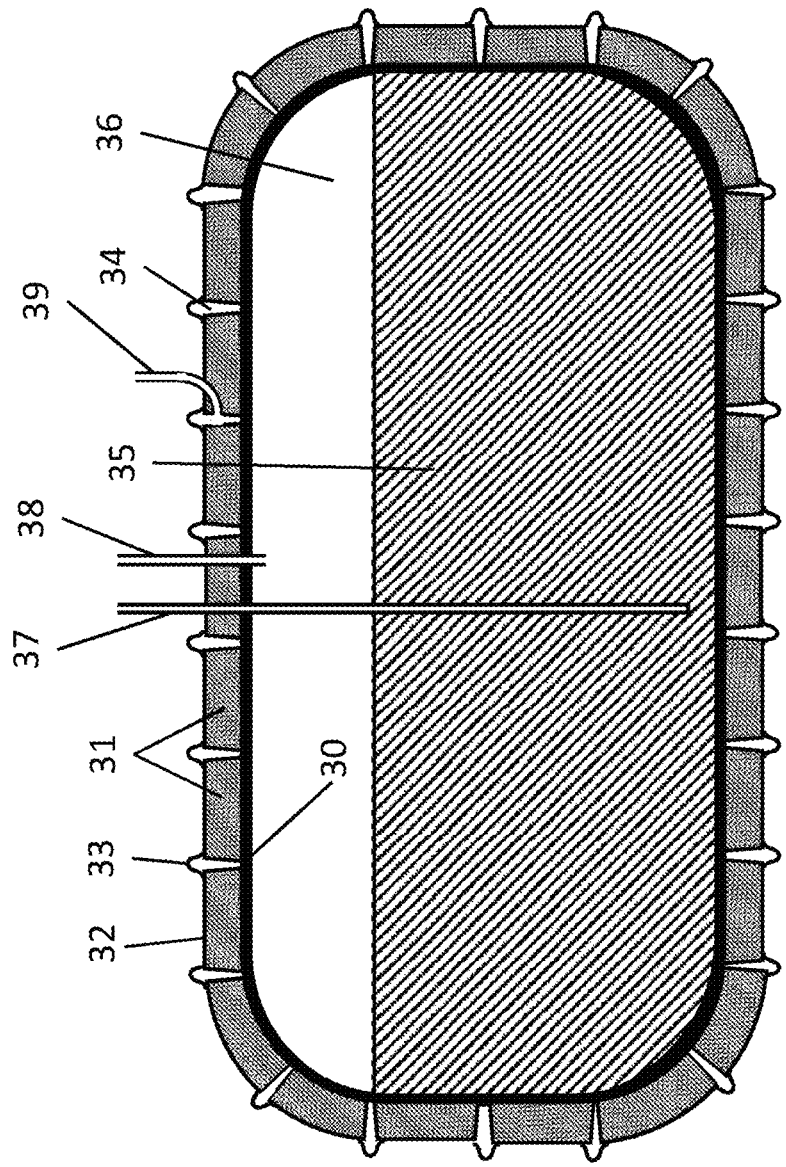

FIG. 3 illustrates the concept of the current invention. 30 indicates any type of containment system such as cylinder, sphere, lattice pressure vessel or any type of pressurized or unpressurized prismatic or other shaped containment. The modular vacuum insulation system consists of insulation blocks 31 covering the entire surface of the tank. There is a thin, leak-proof, corrugated membrane 32 and 33 covering the entire outer surface of the tank with the insulation blocks thereby forming a secondary shell. The corrugation 33 is an important part of the concept since the main tank 30 will contract significantly when filled with a cryogenic fluid. It is also significant that the insulation blocks are separated by open spaces 34 that serve two main purposes: (1) they prevent the insulation blocks from being squeezed into each other when the main tank contracts due to cooling, and (2) they serve as air drainage channels covering the entire insulation layer on top of the tank during the vacuum process. Clearly the pattern of these gaps is consistent with the pattern of insulation blocks. FIG. 3 also shows the cold liquid 35 inside the tank and a part 36 on top which is in gaseous form. There are also piping systems 37 and 38 enabling controlled fluid filling and discharge from the outside. The pipe 39 indicates a connection between the air drainage channels 34 in the insulation and an external vacuuming pump system. The internal pressure within the tank 30 corresponds to vapour pressure which in turn depends on degree of filling and the actual fluid temperature. Additionally, there will be gravitational and dynamic pressure components. A most important aspect is to achieve a best possible thermal insulation to keep temperature and pressure build-up within acceptable bounds. The purpose with vacuum insulation is thus to achieve best possible thermal insulation.

The corrugated membrane covering the entire outer surface of the tank system has similarities with cryogenic membrane tanks, typically used for LNG containment, and outlined in connection with FIG. 1. The membrane in such laterally supported tanks provides the direct leak barrier against the cryogenic fluid inside, and it is this membrane barrier that will thermally contract due to the cooling from the cryogenic fluid inside. The contraction of this metal membrane results in stretching of the membrane and, particularly, stretching across the corrugations. In the present invention the principle is "opposite" since it is the fluid holding, structural containment that contracts while the membrane remains with relatively unchanged temperature of the externally surrounding air or gas. The contraction of the strong internal tank, typically a pressure vessel, forces the insulation and membrane to be pushed together resulting in that the corrugations will be exposed to compression rather than stretching as is the case for internal membrane tanks. As will be outlined later a major contribution of the current innovation is also a special geometry developed for the corrugations that results in much reduced plastic straining shaping of the corrugated membrane and much reduced elastic stresses during thermal deformations.

Figure 4:
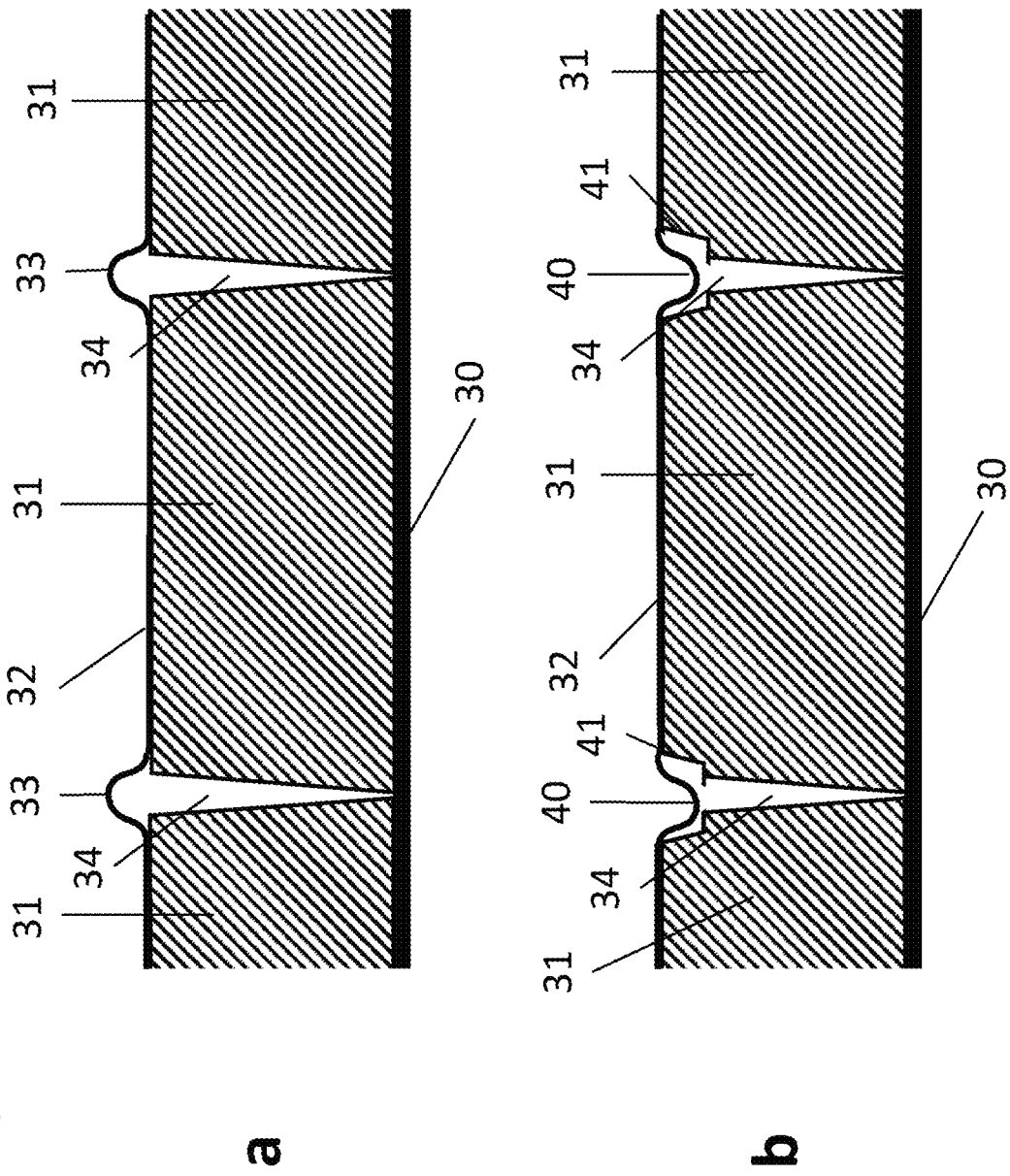
FIG. 4 illustrates the block element concept in further detail

FIGS. 4*a* and 4*b* illustrate in further detail two versions of the current block vacuum insulation concept. 30 is the outer shell surface of the fluid containment as described in FIG. 3. Assuming significant cooling of the tank with fluid inside, the tank surface will contract correspondingly and consistent with thermal properties of the tank material and the imposed lowering of temperature. An indication of contraction in the case of liquid hydrogen at −253° C. inside the tank is about 4.7 mm per meter from +20 to −253 C mm per meter length for austenitic stainless steel. As shown in further detail the load bearing element of the insulation system consists of porous or fibrous light-weight insulation blocks 31 which are fixed to the surface of the containment 30 with mechanical and/or glue attachment; such means will be described later. The block material must be sufficiently open and porous such that air or gas initially entrapped in the insulation can be fully evacuated as part of the vacuuming procedure. The blocks are separated by initial gaps 34. The shape and width of these gaps must be such that they do not close during cooling and thermal contraction of the fluid containment 30 to avoid overlapping and rather maintain open channels for achieving and maintaining vacuum around the entire tank. Thus, the size and shape of these gaps depend not only on how much the containment contracts but also on the actual size of the blocks. Examples of block sizes may be from 0.5 to 2.5 m whereas other block sizes may be feasible as well. Typical thickness of the insulation blocks may be from 0.1 to 0.5 m or even 1 m whereas other thicknesses may be feasible as well. Note that the insulation blocks are flexible and can accommodate the same contraction as the containment at the tank surface whereas the outer part of the block remain rather undeformed with only small changes due to thermal variations of the externally surrounding gas or air.

A requirement for achieving vacuum is that the vacuum space is fully leak tight and that the external flexible shell remains intact without damage during operation. This is achieved by applying a leak-tight membrane on the outside of the insulation blocks with the ability to comply with the overall thermal contraction of the inner tank. The corrugations spanning the open gap between blocks is key to dealing with the tank contraction. FIG. 4*a* shows outward corrugation in some further detail while 4*b* show an alternative inward corrugation 40. Both solutions are fully feasible and function essentially in the same way during tank contraction. The membrane is also subjected to external pressure caused by atmospheric pressure on the outside and vacuum within the insulation layer; hence about one bar external or 0.1 MPa pressure. In the case 4a the pressure works on an outward, arch type geometry 33 that results in a membrane stress component in compression giving a small "push" across the gap. For case 4b the difference is that pressure works on an inward, "hammock" type geometry 40 resulting in a membrane stress component in tension giving a small "pull" across the gap. Both principles will work. An advantage by outward corrugation is that necessary welding of membrane parts becomes more accessible and easier with outward corrugation than for the inward case. Inward corrugation requires less space and is less vulnerable to mechanical damage from outside sources. Inward corrugation may also require that the geometry of the gaps between blocks is modified with an additional groove 41 to provide room for the corrugation and thereby avoiding direct contact with the insulation blocks.

Figure 5:
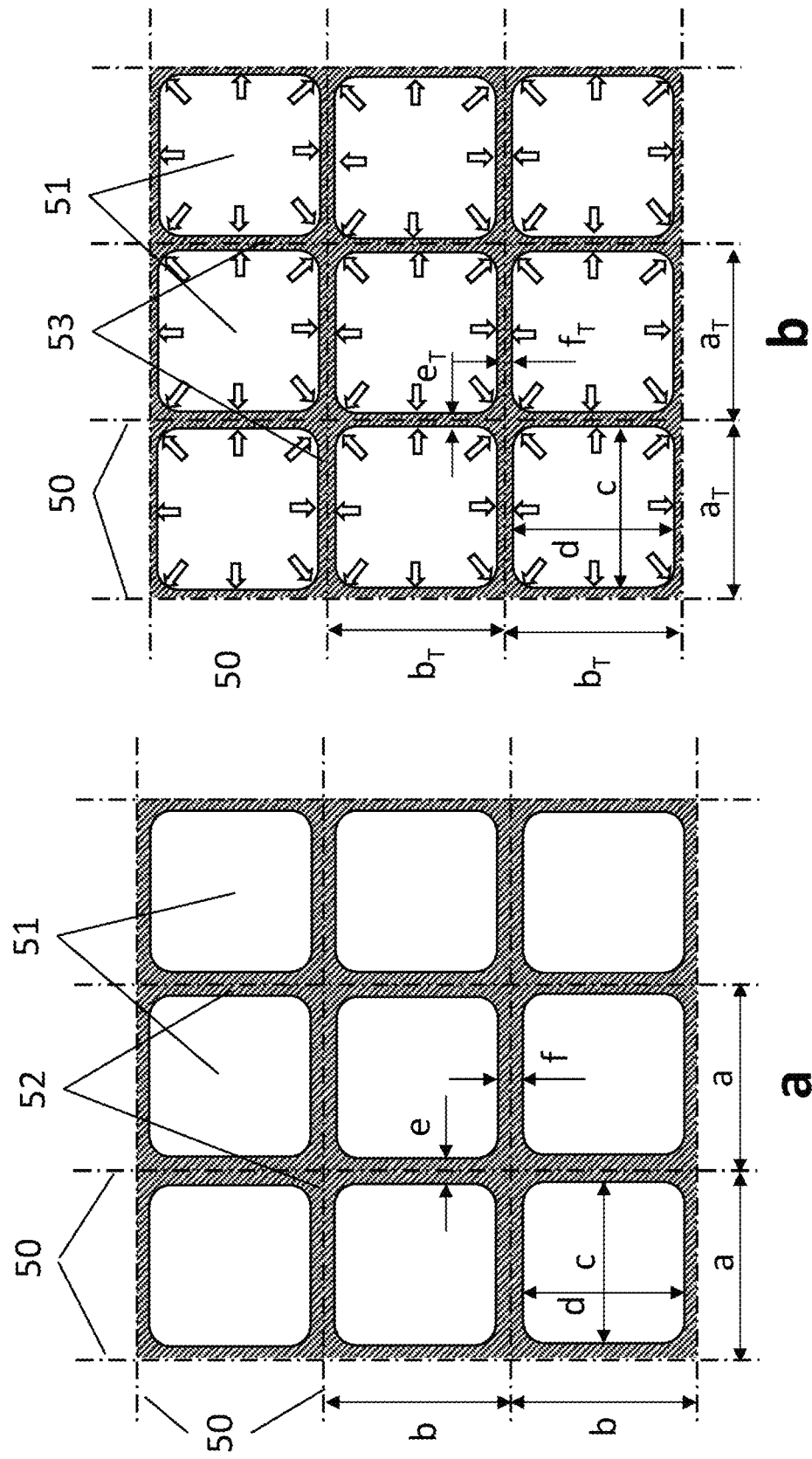
FIG. 5 illustrates how a tank system contracts during cooling and such contraction is compensated for in corrugation zones of the outer membrane

The purpose of FIG. 5 is to explain in further detail how the invention works. FIG. 5a shows an outside view of a surface section with 3 by 3 pattern of insulation blocks before the cooling of the main tank has taken place. The lines 50 may be seen as system lines marked on the surface of the inner containment before cooling takes place. The distance between the system lines is a in one direction and b in the other. The figure also shows the membrane areas 51 between corrugations and the corrugation pattern 52 (inward or outward oriented) located between blocks before cooling. The sizes of the contact areas are c in one direction and d in the other. The spans of the corrugations are thus e=a−c in one direction and f=b−d in the other. FIG. 5b illustrates the situation after thermal cooling where the distances between system lines 50 on the inner tank have been reduced to $a_T$ and $b_T$. The actual contraction depends on the temperature change $\Delta T$ after cooling of the tank and the secant modulus of thermal expansion for the tank $\alpha$, thus $$a_T = a(1+\alpha\Delta T), \text{ and } b_T = b(1+\alpha\Delta T) \quad (1)$$

Note that $\Delta T$ is negative for cooling such, as an example, −273 C for liquid hydrogen in relation to an initial temperature of 20 C before cooling. The outer membrane is not subject to significant own thermal contraction since it remains at current outside temperature. This means that the thermal contraction of the inner tank has to be accommodated by mechanical contraction within the corrugation zones shown shaded in the figure. The span $e_T$ and $f_T$ of the corrugation zones thus become after cooling $$e_T = a_T - c, \text{ and } f_T = b_T - d \quad (2)$$

where the actual mechanical contractions to be taken by the corrugation are $$\Delta e = e_T - e = a\alpha\Delta T, \text{ and } \Delta f = f_T - f = b\alpha\Delta T \quad (3)$$

The contraction to be taken by the corrugation is proportional to the distances between the system lines 50 with a and b. The size of the corrugation spans e and f must be chosen in accordance with what is mechanically feasible which in turn primarily depends on the actual corrugation design. Choosing larger distances a and b means less corrugation and welding and cheaper solution. Numerical simulations show that distances between corrugations of about 2 meters are feasible with the current invention; this is about ten times larger than the current type of corrugation design shown in FIG. 1. The typical block size side dimensions, as represented by a and b, are preferably in the range 0.25 to 2 m, but smaller dimensions are possible and also larger dimensions, especially for less demanding applications than LH2. Corresponding gap sizes are preferably sufficiently wide to retain open gaps at all times, meaning that the curved parts span or gap sizes e and f preferably are larger than the respective strains $\Delta e$ and $\Delta f$, wherein both $\Delta e$ and $\Delta f$ are negative. The gaps g and the corrugation spans are not necessarily identical. However, if $g_a$ and $g_b$ represent initial gap in the two directions, the non-closing condition of the gaps is $$g_a + \Delta e > 0, \text{ and } g_b + \Delta f > 0 \quad (4)$$

As for the curved parts and the widths thereof, the deltas are negative.

Regarding the width of the curved parts, and considering the absolute values of $\Delta e$ and $\Delta f$, e is preferably at least 2 $\Delta e$, even more preferably at least 3 $\Delta e$ or 5 $\Delta e$, but preferably not wider than 8 $\Delta e$ or 10 $\Delta e$ or 15 $\Delta e$. And likewise, f preferably is at least 2 $\Delta f$, more preferably at least 3 $\Delta f$ or 5 $\Delta f$, but preferably not wider than 8 $\Delta f$, or 10 $\Delta f$ or 15 $\Delta f$. The curved parts preferably have an initial height of at least 0.5 $\Delta e$ and 0.5 $\Delta f$, respectively, to ensure a uniform direction of bending. Since the outer shell in practice will be in a static condition for years, since the inner tank will be held at cryogenic temperature, there is no specific limits on minimum or maximum width of the gap and/or the curved part, since even a plastically strained curved part or a very wide curved part will be airtight. Retaining an open gap is preferred for facilitating vacuum formation in the insulation and avoiding plastic strain in said curved parts, while avoiding a very wide gap is preferable for reducing heat ingress by radiation and for avoiding questioning the robustness of the outer shell.

Figure 6:
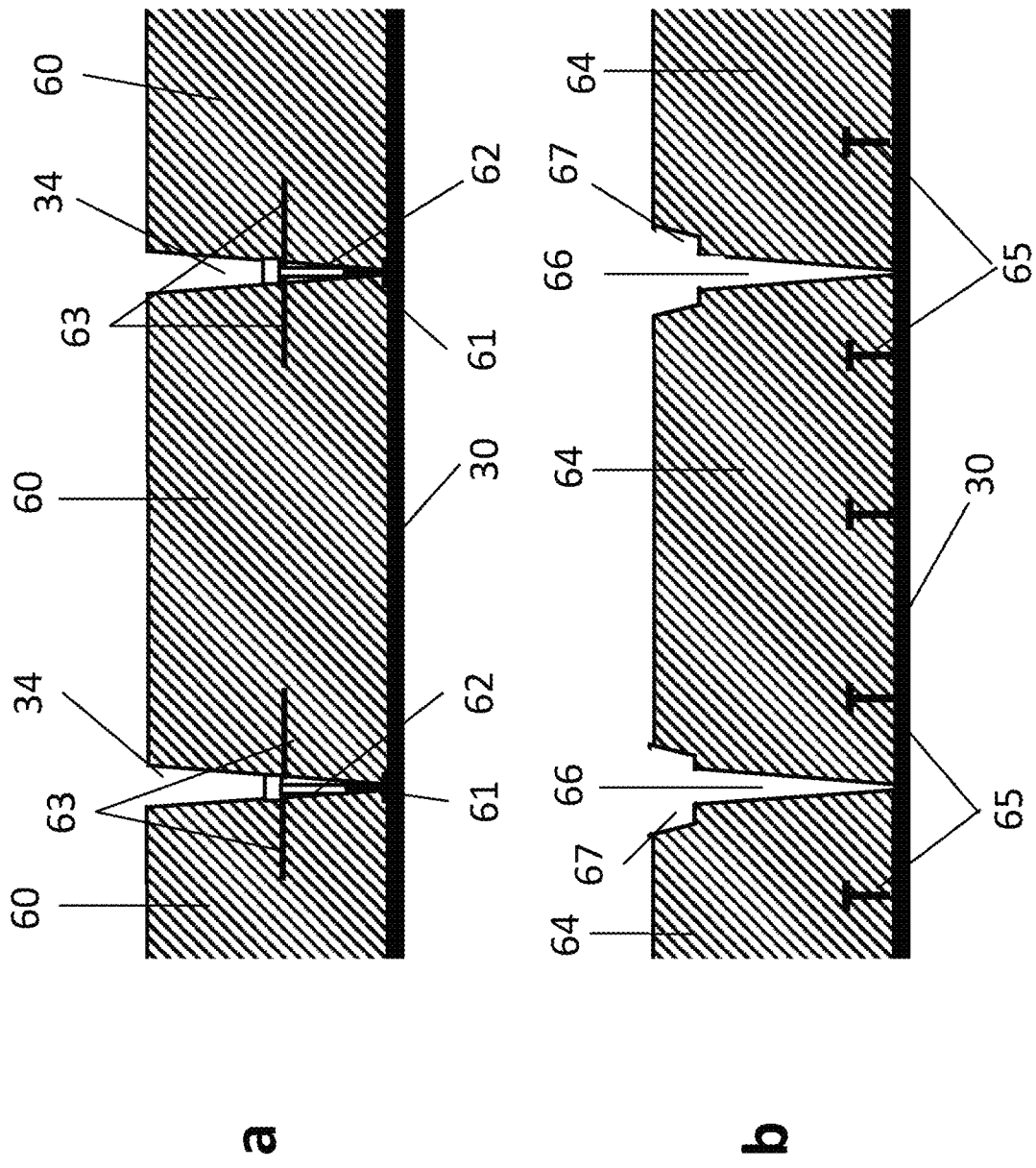
FIG. 6 illustrates how the block elements may be positioned and attached to the surface of tank by mechanical means

There are principally two ways by which the current insulation block system may be implemented. First, the blocks may be fully prefabricated with or without an outer membrane layer. The insulation block may be produced as a single layer or by having multiple insulation layers glued together. The outer geometry must be made with exact dimensions which may require precise cutting or grinding of surfaces. Attachment to the surface of the containment 30 may be done with a combination of mechanical fastening and gluing. FIG. 6a shows an example where the prefabricated insulation blocks 60 are attached to the inner shell with mechanical fastening devices 62 connected with rails 61 that have been welded to the surface of the containment 30 in the precise positions of the system lines 50 shown in FIG. 5. These protruding rails or sections of rails can thereby serve the purpose of exact positioning of the insulation blocks 60. Equally important, the rails 61 can also provide mechanical attachment points between the insulation block and the surface of the containment 30 as indicated in the figure. For the case shown there is an extension piece 62 to the rail 61 and a connection between the end of this piece and spikes 63 that are inserted into the insulation block. Fastening is done by firmly attaching the extension piece 63 on top of spikes 62 and rail 61 thereby securing that the block will be mechanically locked in place. Materials used for the attachments should be consistent with acceptable thermal properties and strength. Other block fastening solutions are also feasible.

An alternative to using prefabricated blocks is that the entire surface of the containments is sprayed continuously, layer by layer, with insulation 64 with the desired properties, see FIG. 6b. Further, in this case there may be mechanical attachments or anchors 65 fastened to the containment surface to ensure mechanical anchoring in addition to the chemical binding that takes place between the containment surface and the sprayed-on insulation. The required gaps between blocks 66 can be carved, cut, or sawed after finishing the laying of the insulation. FIG. 6b shows a case where this has been done including an additional space 67 that can accommodate for inward corrugation.

Figure 7:
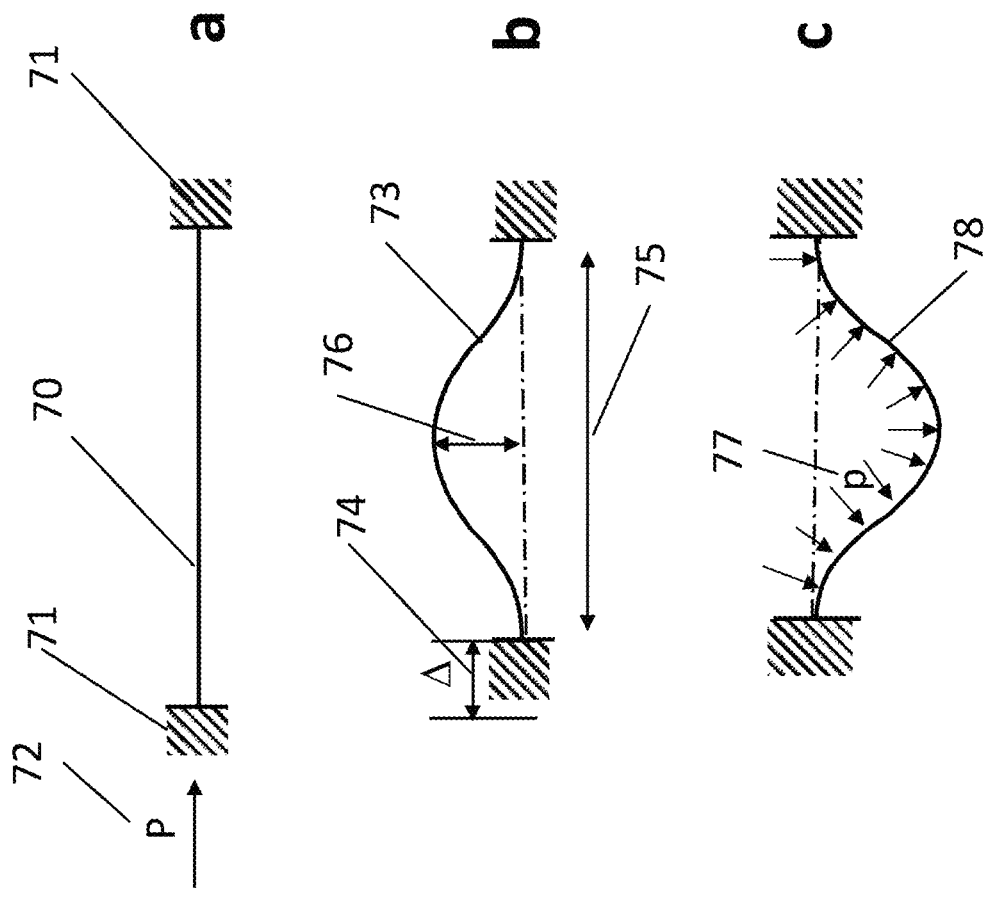
FIG. 7 illustrates the development of corrugation geometries may de derived from beam and plate buckling patterns

As stated, the mechanical contraction of the outer membrane caused by the cooling of the containment tank must be absorbed by the membrane corrugations covering the gaps between blocks. A basis for a best possible shape of corrugation can be found in a geometry that generate as little potential energy as possible during contraction, implying smallest possible deformational stresses. As will be known, a clamped beam that is subjected to axial loading, or equivalently, to a forced shortening, will buckle into a geometric shape that is defined by a mathematical cosine function. This solution may be derived from beam equations using the principle of minimum potential energy for the stability problem. Hence, the cosine function is the shape that results in the smallest possible accumulation of stresses within a clamped beam during buckling. This fact leads to the conclusion that the cosine function may also be a very good geometry for membrane corrugations since it represents minimum energy condition for buckling or compression of a thin plate crossing the gap between blocks. FIG. 7a shows a thin, elastic plate 70 with clamped sides 71 subjected to an end load 72. FIG. 7b further shows correspondingly an elastic buckling shape 73 as result of the finite displacement Δ at the end 74. With only small displacements the buckling shape is in both cases an exact cosine function.

Although the cosine function applies only for infinitesimal deformations it can easily be scaled to any span 75 and amplitude 76 that one would select for the corrugation. Numerical stress calculations of the membrane deformation have also confirmed that scaled-up cosine functions work very well as definition of initial corrugation shape. Going one step further, the principle of using buckling shapes for corrugations may easily be extended by utilizing more advanced buckling shapes that account for large displacement effects. Rather than using simple cosine functions the preferred shape may be generated by structural computer simulations accounting for large displacement effects; such shapes have been shown to perform even better than small deformation cosines. Large displacement buckling shapes can also be scaled according to desired span 75 and amplitude 76 for the corrugations. Accordingly, FIG. 7b may also represent so-called nonlinear theory buckling shapes. FIG. 7c indicates that it is also feasible to generate corrugation shapes 76 accounting for changes in geometry caused by lateral pressure 77 in addition to large displacement effects. The figure shows this for inward corrugation 78 although the method defined herein applies equally well for inward and outward corrugations.

Figure 8:
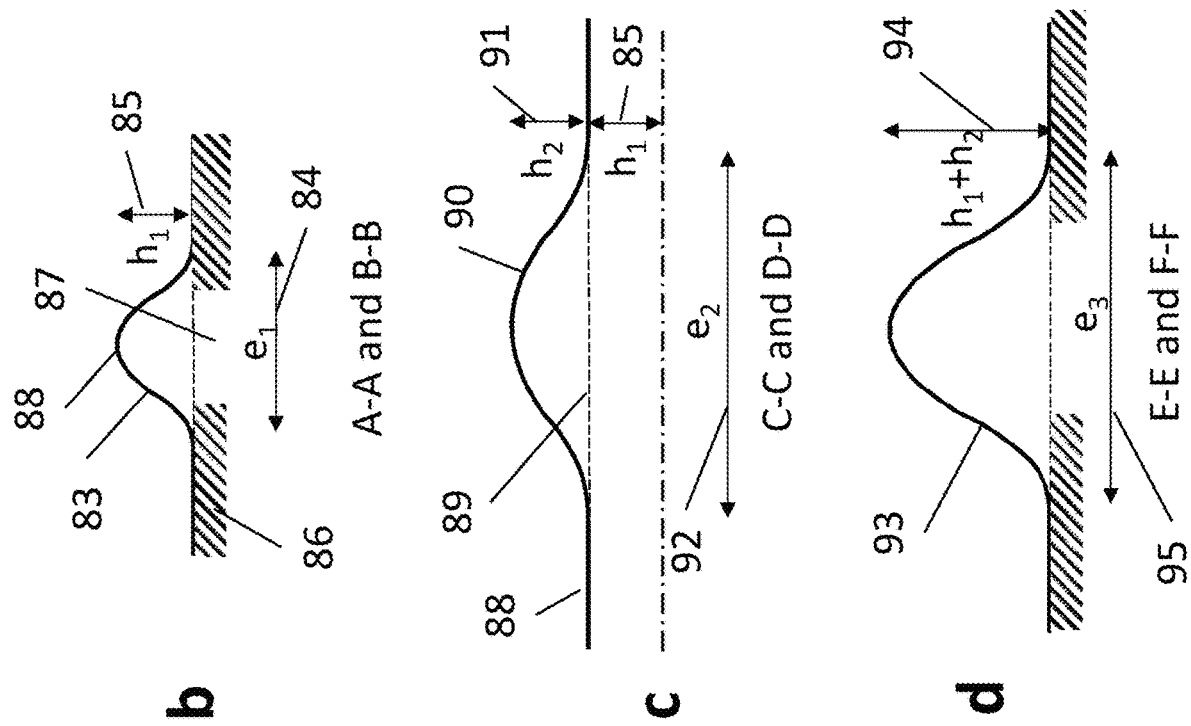
FIG. 8 illustrates the development of corrugation geometries for intersections between crossing corrugation lines
Figure 8:
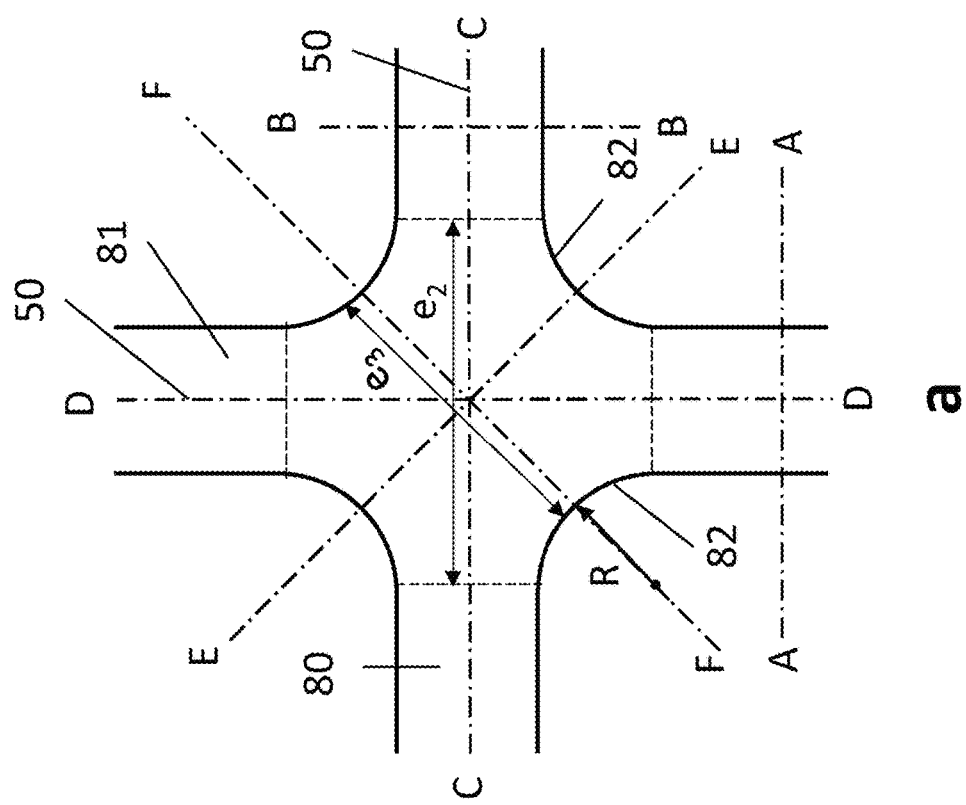

Although the method for deriving corrugation shapes for membrane side joints between blocs straight, forward extension of these channel shapes to crossing corrugations will not work since the crossing corrugations will fully lock against contraction at these points, ref also FIG. 5. This problem is solved by a further extension of the current buckling shape approach of the current invention. FIG. 8 illustrates the zone between two crossing corrugations 80 and 81. Specifically, FIG. 8a shows from outside two crossing corrugations in accordance system lines 50 shown in FIG. 5. A key to generating as low stresses as possible it to avoid geometric knots or hard points, thus the corners at the crossing corrugations are rounded 82 with curvature radius R. FIG. 8b shows the initial buckling type cross section geometry 83 of the corrugated membrane at positions away from outside the intersection zone, such as at section cuts A-A and B-B. The figure also indicates the corrugation span 84, initial corrugation height $h_1$ as 85, underlying support from the insulation blocks 86 and the span $e_1$ as 87 of the corrugation between insulation blocks. 88 indicates the apex line of the straight corrugations being positioned above the system lines 50. FIGS. 8c and 8d illustrates the key to avoiding that the intersecting corrugations will lock. Rather than employing a direct continuation of the top of the corrugations 88 with what is shown as a dotted line 89, an "additional buckle" 90 with additional height $h_2$ as 91 is superimposed at the system lines of the intersection. The flexibility provided by this superimposed buckle with length $e_2$ as 92 enables the intersection to contract in the system line directions as well as diagonally as shown in FIG. 5b. A further definition of geometry of the intersection geometry is indicated in FIG. 8d showing the membrane geometry 93 along diagonal cuts E-E and F-F where the span 95 is $e_3$ and the corrugation height 94 is the sum of $h_1$ and $h_2$. Note that $e_2$ and $e_3$ are direct functions of choosing $e_1$ and R. The corrugation geometry of the membrane corrugation between the lines shown in FIG. 8b, c, d may simply be generated by function smoothing programs that are readily available and used in computer aided design and computer graphics.

The corrugation geometry shown in FIG. 8 may be based on simple cosine functions or by use of more advanced, large displacement buckling functions including application of lateral pressure in generating the geometric functions. A further advancement is to generate two-dimensional plate buckling shapes by numerical, linear or nonlinear plate buckling simulation, for instance using finite the element method. The loading case for such simulation corresponds to buckling by contraction for the case shown in FIG. 5b. Numerical simulations and testing of this method has shown that it works very well.

Figure 9:
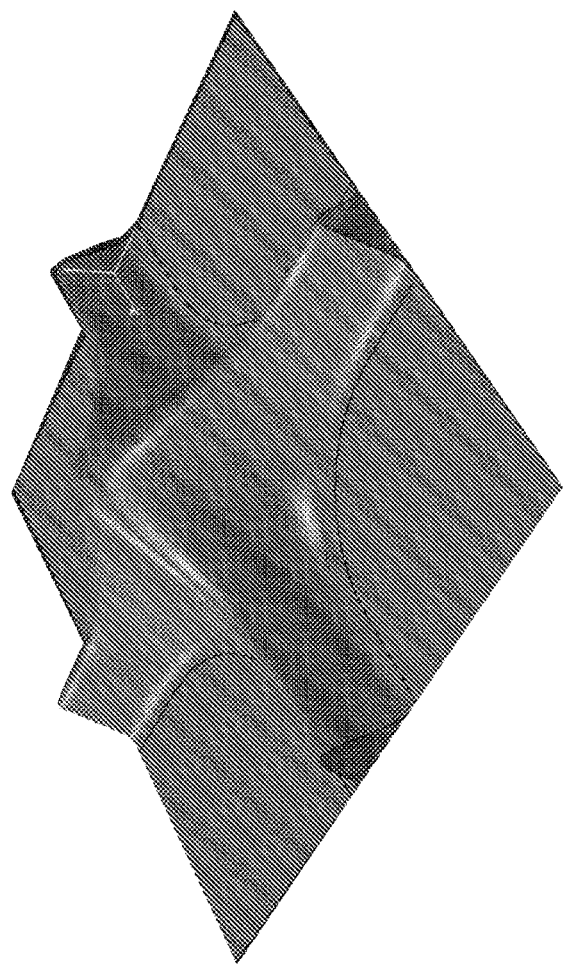
FIG. 9 shows an example of corrugation geometry generated by computer simulation and computer graphics

FIG. 9 shows an example of membrane corrugation geometry generated using the method described herein. The good performance of this corrugation has been confirmed by extensive nonlinear finite element analysis and shows good capability of absorbing contraction between insulation blocks and smooth stress levels without severe "hot spots".

Clearly, a pressure vessel always includes singly or doubly curved surface areas to complete a full three-dimensional enclosure. Block elements shown in FIGS. 4 and 5 can easily be adopted curved geometries, either by premanufacturing blocks with curved geometry or, simpler, by spray-on of insulation followed by carving of gaps between block elements. In particular, the current modular vacuum insulation solution provides the opportunity of vacuum insulation of very large size containments; this is important since such technology has not previously been available. As stated before, lattice pressure vessels (LPV) are uniquely fully scalable in size, and the combination of LPVs with the block type vacuum insulation solution of the current invention opens for very important applications. FIG. 10 illustrates with three side views of a combination of a mainly prismatically shaped LPV with rounded corners 100 and the insulation system of the invention. The system division into insulation blocks for the flat sides of the tank 101, 102, and 103 is straight-forward and in accordance with principles previously described. Note that the blocks can be different in form and size on the different side in order exactly to fit the tank geometry. The transition areas between the flat sides are defined by cylindrical surfaces 104. Cylindrically shaped blocks can be applied at these rounded side junctions. For the case shown a strip with single elements is used in these zones whereas multiple elements clearly also may be use when the rounding radius is large. The corners where three planar sides meet require doubly curved blocks 105. In this example, consistent with the single row of blocks at the curved side junctions, there is only one doubly curved block element at each of the eight corners. These block elements are triangular in shape while each triangular corner has 90 degrees angles; this is factually feasible as for an ⅛ zone of a sphere. Larger size spherical sections with many block elements are also feasible by implementing triangular block elements and the possibility for T-shaped joint corrugations. Thus, the invention may also be applied for cylindrical shells with rounded end caps and for spherical shells.

Further Remarks on Design, Principles, and Implementation of the Invention

This invention deals with a new solution for vacuum insulation of tanks holding fluids at below zero and cryogenic temperatures enabling that vacuum type insulation can be applied to very large tanks of any size and shape for which no such insulation system has been available before. The solution provided may be used for tanks that are subject to extremely low temperatures, such as containments for liquid hydrogen, and where the overall, accumulated thermal contraction of the tanks itself can be very large. The invention is also suited for thermal insulation of pressure vessels with singly and doubly curved surfaces. The double layer type vacuum insulation can also be used for tanks holding fluids at very high temperatures accompanied with substantial thermal expansion of the inner tank and stretching across block joints.

The basic concept of the invention is that vacuum insulation of cryogenic tanks can be prefabricated as mostly similar block elements that are firmly and safely attached to the outer surface of the inner tank. The specific dimensions of these insulation blocks depend on the tank geometry in such a way that the elements fit the size and shape of the parts of the tank surface. Typical base size of a block element can be 0.25 to 2.5 meters or more, depending on the specific thermal range, material properties and tank shape. Assuming for example that the cryogenic tank contracts 6 mm per meter tank, the gap between adjacent block elements at the skin would thus shrink 3 to 15 mm for the block dimensions mentioned. Such contraction of sealing joints between block elements are feasible with the present invention.

The thickness of the insulation material inside each block may depend on the type of insulation material used. Polyurethane foams (PUF) are widely used as insulation material for industrial, cryogenic applications. Such material may also be strengthened and stiffened with glass fiber or other types of fibrous reinforcement and referred to as reinforced polyurethane foam (R-PUF). For instance, such material is widely used in insulation of large-scale shipping tanks for LNG. The tension strength is often higher than the compressive strength for these materials whereas the latter capability is more relevant in the current application; and typically, the strength increases with lower temperature. Normal long-term, compressive strength may be within the range of 1 to 2 MPa which is significantly more than the actual loading after vacuuming which is about 1 atm. or 0.1 MPa. A good reference on such insulation may be found in the link: http://www.ivt.ntnu.no/ept/fag/tep4215/innhold/LNG%20Conferences/2007/fscommand/PO_11_Y_Lee_s.pdf The type of insulation material applied may vary from among blocks. For instance, blocks that are an integral part of the tank support system may be chosen to have higher stiffness and strength than blocks that are only subjected to atmospheric pressure.

The insulation material primarily serves as support for keeping the distance between the outer shell and the cryogenic tank. Ideal vacuum does not transfer heat by conduction and convection and, thus, it is primarily the insulation material that results in conductive heat intrusion. The insulation also strongly reduces the heat transfer by radiation. Thus, a thicker insulation layer reduces the total heat transfer (heat ingress). Thermal stressing will also develop in the insulation layer depending on thickness; the thermal stresses within the insulation material itself will be small because of low stiffness of such material. Optimal insulation thickness should be decided for the specific application considering insulation performance and cost.

The invention provides a tank with an insulation system utilizing vacuum applied to a closed, thermally refrigerated containment tank. Features of particular interest are: An insulation layer constructed from preferably prefabricated, modular insulation block elements attached to the tank where the blocks elements and connection between the blocks preferably have the following characteristics:

the blocks are sized and shaped in accordance with the overall geometry of the tank and surface form at the position of mounting of the block such as flat, singly curved, or doubly curved each block has an outer, airtight skin which forms an airtight barrier against the supporting insulation material under this layer the outer surface skin is smaller in size than the footprint of the block projected onto the containment to provide an open gap between adjacent blocks that remain separated during thermal contraction of the inner tank airtight and contractable sealing is attached over the surface opening of the gap the outer sealing skin is attached to the supporting insulation material by glue and or mechanical devices a porous, insulation material under and connected with the outer skin for which spacing material all air can be evacuated and can strength-wise fully sustain and support the external pressure onto the outer skin after air evacuation (vacuuming)

devices for positioning and fixing the insulation blocks onto the surface of the containment which may contain guiding rails, glue, and mechanical fixation a continuous membrane sealing system between and attached to neighboring blocks consisting of air-tight, connector thin plate strips attached to the outer skin of the blocks where this connecting sealing has material and corrugated shape that allows for change of the relative distance between the top layer skins of adjacent blocks caused by thermal contraction of the inner tank while the sealing system also carries the load provided by the pressure difference between outside air and near vacuum such that the completed system of attached insulation blocks and sealing between the blocks provides a complete, airtight sealing and insulation system surrounding the entire outer surface of the insulated tank thereby enabling airtight, vacuum like insulation allowing for very large temperature differences between containment and surroundings (such as difference up to 300 degrees C. or beyond)

an important part of the invention is the particular definition of geometry of the corrugated skin spanning the open spaces between blocks whereby the shape and its deformability is based on the principle of minimum potential energy and whereby of the outer skin allows for the contraction of the inner tank without creating high stress concentrations and "hot spots" in the corrugations and, in particular, avoiding high stresses where corrugations meet at crossing joints As an alternative to the prefabricated block concept described above, the blocks may be formed by spraying the insulation material layer by layer onto the inner tank and the block shape is created thereafter by carving, grinding, or sawing gap openings to form insulation blocks with non-closing gaps between. Anchor devices may be attached to the tank surface before spraying to ensure good contact between insulation and tank at all times. The outer surface may be smoothened to ensure good contact when applying the planar and corrugated parts of the outer skin. In other respects, this approach has the same properties as listed above.

In some preferable embodiments, the tank and the method of fabricating the tank also includes complete prefabrication of a vacuum tank and fast and efficient installment in a ship or vessel. Special ways of lifting, transporting, mounting and supporting a tank of the type described herein are also feasible and these features are described within a separate invention. Notably the solution described make it feasible to avoid the use of woodblock support and associated heat bridges to the tank since the insulation is used for support, including at least one soft support structure. Feasible benefits include being able to complete and fully pressure test the tank and check for leakage in the insulation at the manufacturing site before transport and installation. Lifting, transport and installation may be performed without interference and damage to the insulation system. Further details can be found in the patent application NO 20200965 and the international patent application claiming priority therefrom, both of which are incorporated herein by reference.

A general embodiment of a tank of the invention comprises an inner tank and an outer airtight corrugated, flexible shell, with block elements of insulation arranged together between the inner tank and the outer shell, wherein vacuum is maintained in the volume between the inner tank and the outer shell when the tank is in operation, the insulation elements include an air tight outer side and are arranged apart a distance ensuring retainment of open gaps between block elements after cooling and that stresses in the outer membrane type shell including corrugations remain within acceptable limits. The general tank embodiment can include any feature or step in addition as described or illustrated in any operative combination.

The invention claimed is:

1. A tank for storage and transport of fluids at cryogenic temperatures, the tank comprising:
    an inner tank;
    thermal insulation; and
    an outer shell that is airtight;
    wherein the thermal insulation is arranged outside the inner tank and the outer shell is arranged outside the thermal insulation;
    a coupling through the outer shell, wherein a vacuum pump outside the tank can be coupled for suction of air and gas from a volume between the inner tank and the outer shell;
    an opening from outside the tank to inside the inner tank for loading and unloading of fluid;
    wherein the inner tank in operation contains fluid and the volume between the inner tank and the outer shell is at vacuum;
    wherein the thermal insulation comprises several block elements arranged side by side on the inner tank, with a gap in between the block elements; and
    wherein the outer shell comprises several parts that have been joined together to cover the whole outer surface of the insulation, wherein parts of the outer shell covering an insulation block element have a shape matching a shape of the insulation block element and parts of the outer shell covering the gaps between the block elements have inward or outward oriented curved shape if seen in cross section along the respective gaps and are flexible by contracting or stretching the inward or outward curved shape.

2. The tank according to claim 1, wherein the curved parts of the outer shell have a cosine shape, a cosine-like shape, or another smoothly corrugated shape if seen in cross section along a gap.

3. The tank according to claim 1, wherein curved parts, at positions where two curved parts are crossing, have a superimposed cosine shape or a superimposed, smoothly corrugated shape.

4. The tank according to claim 1, wherein an initial curved shape across the gaps is generated by adopting and scaling of shapes generated from computer simulation of buckling of a thin plate spanning the gap between the block elements considering compression.

5. The tank according to claim 4, wherein the computer simulation of buckling considers normal pressure.

6. The tank according to claim 1, wherein an initial curved shape at the crossing between gaps is generated by adopting and scaling of shapes generated from computer simulation of buckling of a thin plate spanning an open area between neighboring block elements at a crossing considering bilateral compression.

7. The tank according to claim 6, wherein the computer simulation of buckling considers normal pressure.

8. The tank according to claim 1, wherein the curved parts of the outer shell covering the gaps are not form stable but contract when the inner tank cools down and contracts and stretch when the inner tank warms up and expand, while the parts of the outer shell over the block elements are form stable and are fastened to the block elements by glue and/or mechanical devices and are not deformed relative to the respective block elements.

9. The tank according to claim 1, comprising outer shell parts with curved superimposed shape where two curved parts are crossing, at the area center of the part, wherein the curved superimposed shape is without joints and the joints between outer shell parts are at locations of minimum stress, whereby the curved superimposed shapes are arranged along centerlines of the outer shell parts.

10. A method of fabricating the tank of claim 1, the method comprising:
    fabricating or providing the inner tank;
    fabricating or providing insulation block elements;
    fabricating or providing an opening piece for filling or emptying fluid;
    fabricating or providing a coupling for a vacuum pump;
    fabricating or providing outer shell parts;
    arranging and fastening the block elements on the outer surface of the inner tank, side by side;
    arranging the opening piece and the coupling for a vacuum pump; and
    arranging and joining together the outer shell parts.

11. The method according to claim 10, wherein the insulation is formed by a spray-on step followed by a step for carving out insulation blocks.

12. The method according to claim 11, whereby the outer shell parts are fabricated by punch and die drawing, deep-drawing or bulging plate elements of austenitic stainless steel or aluminium or other material suitable for the purpose, with the curved parts at the centrelines and with the superimposed parts at the centre of the plate elements.

* * * * *